March 7, 1944.  H. N. FAIRBANKS ET AL  2,343,850
PROJECTOR CONTROL
Filed March 14, 1941  2 Sheets-Sheet 1

HENRY N. FAIRBANKS
ROGER W. WALLACE
INVENTORS

BY *Newton M Pierson*
*J. Griffin Little*
ATTORNEYS

March 7, 1944.  H. N. FAIRBANKS ET AL  2,343,850
PROJECTOR CONTROL
Filed March 14, 1941   2 Sheets-Sheet 2
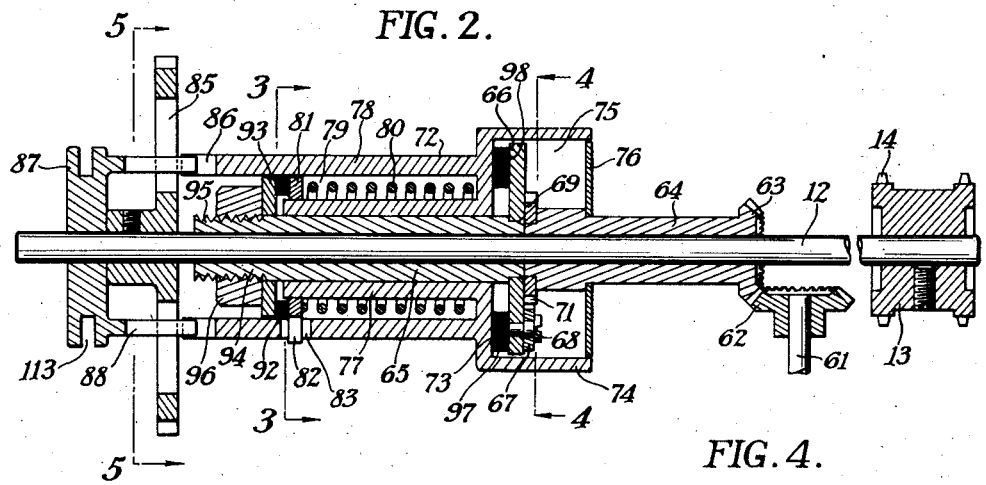
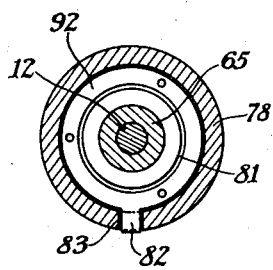
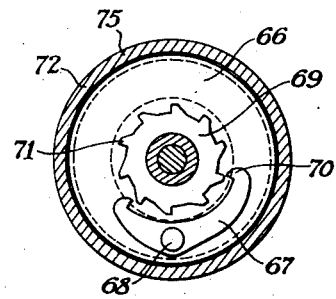
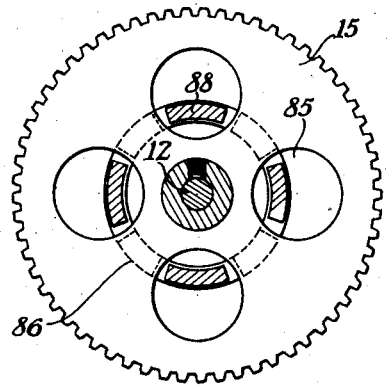
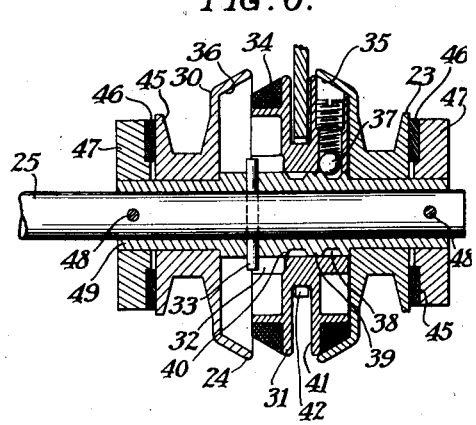
HENRY N. FAIRBANKS
ROGER W. WALLACE
INVENTORS
BY
ATTORNEYS Patented Mar. 7, 1944

2,343,850

UNITED STATES PATENT OFFICE 2,343,850

PROJECTOR CONTROL

Henry N. Fairbanks, Rochester, N. Y., and Roger W. Wallace, Washington, D. C., assignors to Eastman Kodak Company, Rochester, N. Y., a corporation of New Jersey Application March 14, 1941, Serial No. 383,378

9 Claims. (Cl. 242—55)

The present invention relates to a projecting apparatus, and more particularly to controls therefor.

One object of the invention is the provision of projection controls by which the film strip may be fed in a forward or reverse direction through the apparatus, or may be stopped to permit projection of stills, or may be rewound at a high rate of speed.

A further object of the invention is the provision of controls which may be selectively positioned to effect either film feeding or film rewinding.

A still further object of the invention is the provision of a control and a film feeding mechanism which automatically connects the film take-up spindle in driven relation with the feeding mechanism, and also simultaneously and automatically disconnecting the supply spindle therefrom.

Another object of the invention is the provision of controls which simultaneously close the lamp switch, and connect the film feeding mechanism to the drive shaft.

Yet another object of the invention is the provision of controls which are easy to operate, positive in their action, and effective in use.

To these and other ends, the invention resides in certain improvements and combinations of parts, all as will be hereinafter more fully described, the novel features being pointed out in the claims at the end of the specification.

In the drawings:

Fig. 2 is a sectional view through the lower sprocket shaft, showing the relation of the slip and one-way clutch by which the sprocket shaft may be operatively connected to the lower take-up spindle, and the means for connecting these clutches to the sprocket shaft so as to be driven thereby;

Fig. 3 is a transverse sectional view taken substantially on line 3—3 of Fig. 2, showing the arrangement for connecting the clutch housing in driving relation with the slip and one-way clutch;

Fig. 4 is a transverse sectional view through the sprocket shaft assembly shown in Fig. 2 and taken substantially on line 4—4 thereof, showing the one-way clutch for disengageably connecting the sprocket shaft with the take-up spindle;

Figure 1:
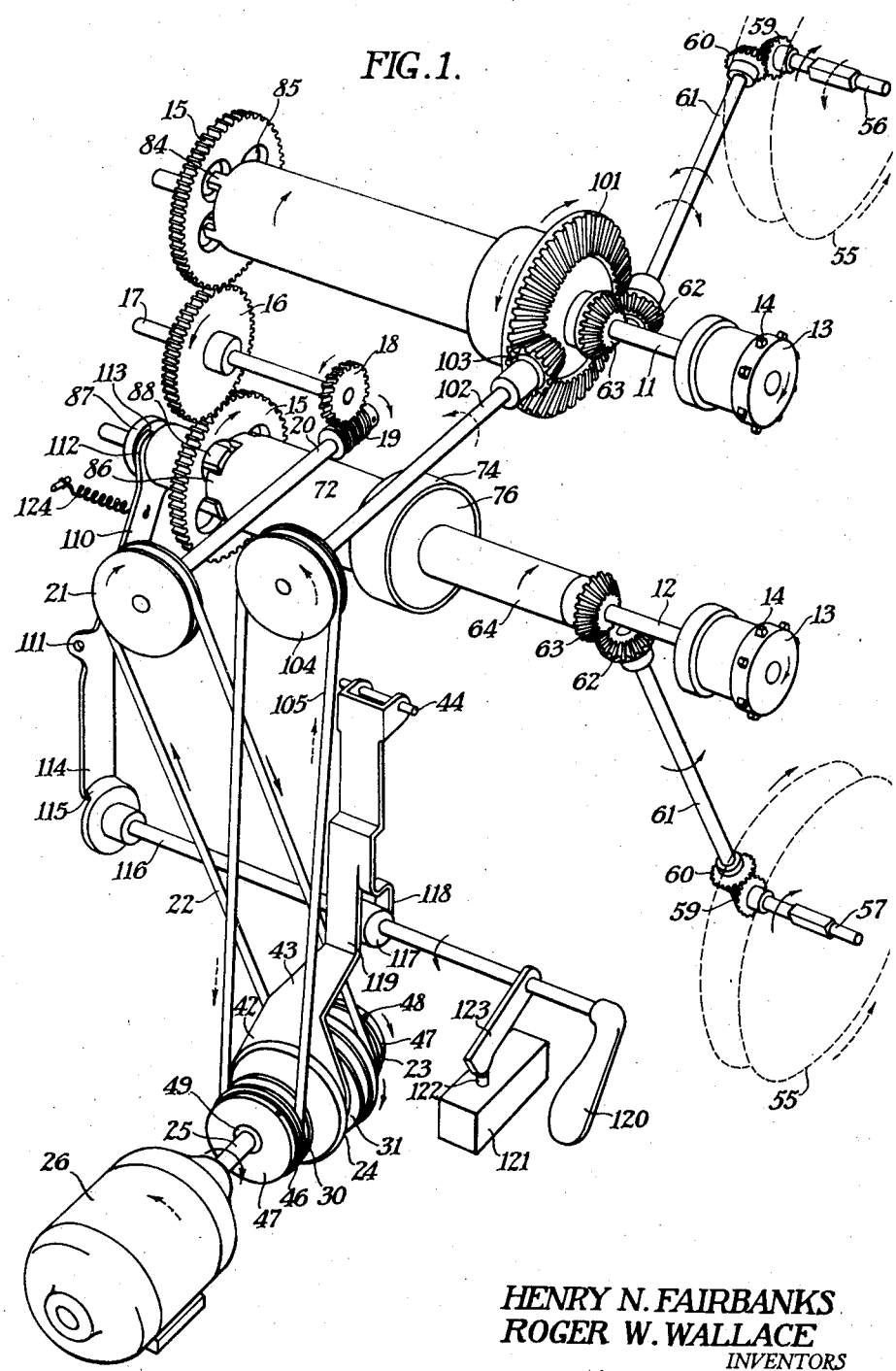
Fig. 1 is a perspective view of the various control members constructed in accordance with the preferred embodiment of the invention, showing the relation and interconnection between the various elements.

Fig. 5 is a transverse sectional view taken through the sprocket shaft assembly shown in Fig. 2 and substantially on line 5—5 thereof, showing one arrangement for operatively connecting the lower clutch housing and clutches to the lower sprocket shaft so as to be driven thereby; and Fig. 6 is an elevation view, with parts in section and parts in elevation, of a double clutch member carried by the drive shaft for selectively connecting the latter to the film feeding or rewinding shaft, and also showing the arrangement for retaining the clutch parts in their various adjusted positions.

Similar reference numerals throughout the various views indicate the same parts.

The present invention relates to a projector, and more particularly to various controls therefor. For the purpose of clarity, only so much of the projector is shown as is necessary to a full understanding of the present invention. The remaining projector parts may be of any standard or well-known construction and do not constitute per se a part of the present invention.

The projector comprises, in part, an upper and a lower sprocket shaft 11 and 12, respectively, positioned on opposite sides of the film gate, not shown. Each of these sprocket shafts has secured at one end thereof a film sprocket 13, the teeth 14 of which are adapted to engage marginal perforations of a film strip to feed the latter through the apparatus, as is well known. The other end of each of the sprocket shafts 11 and 12 has secured thereto a driving gear 15 which is connected to an intermediate gear 16 mounted on one end of a shaft 17 the other end of which carries a gear 18 connected with a worm 19 on the end of a shaft 20. The latter may be termed "a film feeding shaft," for reasons to be later pointed out. Power is taken from the shaft 20 to drive the film feeding claw and shutter, not shown.

It is apparent from an inspection of Fig. 1, that rotation of the film feeding shaft 20 in the direction of the arrow will rotate both the sprocket shafts 11 and 12 in the same direction to drive the sprockets 13 in unison to feed the film strip in a forward direction through the apparatus. It is also apparent that the rotation of the shaft 20 in the opposite direction will reverse the direction of rotation of the sprocket 13, to feed the strip in a reverse direction through the apparatus. The direction of rotation of the sprockets 13, and hence the direction of film movement through the machine, is controlled by the direction of rotation of the shaft 20. The latter has secured to the opposite end thereof a pulley 21 connected by a belt 22 to a pulley 23 forming part of a clutch, broadly designated by the numeral 24, mounted on a drive shaft 25.

This drive shaft is operatively connected to or forms a part of a reversible motor 26 so that the shaft 25 may be rotated in either direction, the purpose of which arrangement will be hereinafter more fully described. The clutch 24 comprises, the pulley 23 and a similar pulley 30, of the shape best shown in Fig. 6, both of which are loosely mounted on the drive shaft 25. A slidable clutch member 31 is positioned between the pulleys 23 and 30 and is formed with a slot 32 adapted to receive a pin 33 protruding from the shaft 25 to spline the member 31 thereon. The slidable member 31 is formed with a pair of cone clutch-faces 34 adapted to engage complementary and similarly shaped faces 35 and 36 formed on the pulleys 23 and 30, as clearly shown in Fig. 6. When the member 31 is slid to the right, as shown in Fig. 6, the right clutch face 34 thereof is moved into driving relation with the face 35 of the pulley 23 to operatively connect the latter in driving relation with the drive shaft 25. If, however, the member 31 is slid to the left, as viewed in Figs. 1 and 6, to bring the other face 34 into engagement with the face 36 of the pulley 30, the latter will be connected to the drive shaft 25, while the pulley 23 will be disconnected therefrom, as will be apparent from Fig. 6. The member 31 also has an intermediate position on the shaft 25 in which the clutch faces 34 are retained out of contact with both of the faces 35 and 36 of the pulleys 23 and 30 so that these pulleys will be disconnected from the drive shaft. The purpose of these various adjustments will be described in due course.

In order to retain the slidable member 31 in any of its adjusted positions, the member has mounted thereon a spring-pressed ball 37 adapted to selectively engage in any of three peripheral grooves 38, 39, and 40, formed on the shaft 25. When the member 31 is in engagement with the pulley 23, the ball 37 will lie in the right groove 38 to retain the member 31 in that position. When, however, the member 31 is in driving engagement with the other pulley 30, the ball 37 will lie in the left groove 40, but when the member 31 is in intermediate or neutral position, the ball 37 will engage the middle groove 39, all as will be apparent from an inspection of Fig. 6. By means of this spring ball and groove arrangement, the slidable member may be retained in any of its adjusted positions.

The member 31 is formed with a slot 41 adapted to receive the forked end 42 of a shifting lever 43 pivoted at 44 to the projector frame or housing. The member 43 need only be moved about its pivot to push the member 31 to either side far enough to allow the ball 37 to ride over the edges of the grooves 38, 39, or 40. All of the drive force necessary for pressure contact of the clutch faces is derived from the engagement of the ball 37 in the proper groove, and not from the shifting lever 43. Thus, after the member 31 has been shifted to either the right or left-hand position, or the middle or neutral position, end thrust on the shaft 25 is eliminated. The member 43 may be adjusted to ride in the groove 41 without rubbing on either side thereof, thus allowing frictionfree running.

When the member 31 is moved into engagement with either of the pulleys 23 or 30, a face 45 of the engaged pulley contacts an annular cork disk 46 carried by a ring 47 secured to the shaft 25 by means of a pin 48. The ring 46 thus cooperates with the member 31 to clamp the particular pulley therebetween to operatively connect the pulley in driving relation with the drive shaft 25. The grooves 38, 39, and 40 may be cut directly in the shaft 25, but they are preferably formed in a sleeve 49 secured to the shaft 25 so as to form an integral part thereof. The pulleys 23 and 30 are loosely mounted on this sleeve 49.

When the member 31 is slid to the right to engage the loose pulley 23, the drive shaft 25 is operatively connected to the "film feeding shaft" 20 to rotate the sprocket shafts 11 and 12 and the sprockets 13 to feed the film strip through the apparatus. The film strip is carried on the film reels 55 detachably mounted on upper and lower reel spindles 56 and 57 respectively. Now when the drive shaft 25 is rotated in one direction, the sprockets 13 will be driven in the direction of the arrows, Fig. 1, to draw the film strip from the upper or supply reel spindle 56, and the strip will be wound up by the lower or take-up reel spindle 57, thus feeding the strip in a forward direction through the apparatus. When, however, the drive shaft 25 is rotated in the opposite direction, by reversing the drive motor 26, the sprockets 13 will be rotated in the opposite or reverse direction and the film strip will then be drawn from the lower film-reel 55 on the spindle 57 and will be wound up by the upper reel 55 on the spindle 56, the lower reel now constituting the supply, and the upper reel becoming the take-up as will be apparent. The term film "take-up" and "supply" reel or spindle is, however, merely relative depending upon the direction of movement of the film strip through the apparatus.

It is important, however, that in either event, the take-up spindle be positively driven so that the film strip may be properly wound up on the take-up reel, while the supply spindle should be free to permit the ready withdrawal of the film strip from the supply reel. As pointed out above, one spindle may be the take-up spindle when the film is fed in one direction through the apparatus, but becomes a supply spindle when the film is fed in the opposite direction. For this reason, means must be provided for operatively connecting the spindle to the drive mechanism when it is a take-up spindle, but disconnecting it therefrom so as to be free when it becomes a supply spindle. As the drive mechanism for both the spindles 56 and 57 are identical, only one will be described in detail, the corresponding parts of two mechanisms being designated by the same numerals.

In the present embodiment of the invention, the spindles 56 and 57 are adapted to be releasably connected with the sprocket shafts 11 and 12 so as to be driven thereby when acting as takeup spindles, but are automatically disconnected therefrom when serving as supply spindles. The spindle 57 has secured to one end thereof a beveled gear 59 which meshes with a bevel gear 60 formed on one end of a shaft 61, the other end of which carries a beveled gear 62 meshing with the gear 63 carried by a sleeve 64 loosely mounted on the sprocket shaft 12, all as shown in Figs. 1 and 2. A second sleeve 65 is also loosely mounted on the sprocket shaft 12 and abuts the sleeve 64, as clearly shown in Fig. 2.

The right end of the sleeve 65, Fig. 2, has secured thereto a disk 66 on which a double arm pawl 67 is pivoted at 68, see Fig. 4. The left end of the sleeve 64, on the other hand, has secured thereto a toothed ratchet 69. It is apparent from inspection of Figs. 2 and 4, that when the sleeve 65 is rotated in one direction, one of the teeth 70 of the pawl 67 will engage with a tooth 71 of the ratchet 69 to operatively connect the sleeve 65 in driving relation with the sleeve 64 to thus drive the lower spindle 57 when the latter is acting as a take-up spindle. When, however, the sleeve 65 is rotated in the opposite direction, the pawl 67 will be automatically moved out of driving engagement with the ratchet 69 and the sleeve 64 will be disconnected from the sleeve 65 and the spindle 57 will run free or idle. The pawl and ratchet 67 and 69 thus provide a one-way clutch between the sleeve 64 and 65.

In order to thus drive the sleeve 65, the latter is operatively connected to the sprocket shaft 12. To this end, a clutch housing, broadly designated by the numeral 72, is mounted on the shaft 12, and is adapted to connect the latter in driving relation with the sleeve 65. This housing, see Fig. 2, comprises an enlarged end portion formed with a bottom 73 and cylindrical sides 74 which provide a casing 75 enclosing the one-way clutch members 67 and 69, see Fig. 2. A plate 76 may be used to close the open end of the casing 75, as shown in Fig. 2. The bottom 73 has extending axially therefrom an inner annular sleeve 77 which rests on and is supported by the sleeve 65, and a second or outer annular sleeve or tube 78 spaced from the sleeve 77 to provide a recess 79 which houses a coil spring 80. An annular disk 81 is loosely mounted on the inner sleeve 77 and is formed with a radial tongue 82 which extends through a slot 83 formed in the outer sleeve 78 to operatively connect the disk 81 thereto.

The upper clutch housing 72 has the left end of the outer sleeve 78 thereof formed with a plurality of axially extending lugs 84 which extend into registering openings 85 formed in the gear 15 secured to the upper sprocket shaft 11. By means of this arrangement, the upper clutch housing 72 is permanently connected to the upper sprocket shaft 11 as will be apparent from an inspection of Fig. 1. The lower clutch housing 12 also has a left end of the outer sleeve 78 formed with a plurality of axially extending lugs 86 which are similar to the lugs 84. The lugs 86, however, terminate short of the lower gear 15, as is apparent from inspection of Fig. 2. In order to operatively connect the lower clutch housing 72 to the lower gear 15, a sleeve or collar 87 is slidably mounted on the shaft 12 and is formed with rightwardly axially extending lugs 88 which are adapted to pass through the holes 85 in the lower gear 15 and into inter-meshing engagement with the lugs 86 on the lower outer sleeve 78 of the lower clutch housing 72, as will be apparent from inspection of Figs. 1 and 2. It is now evident that when the collar 87 is slid to the right, the lugs 88 will extend through the openings 85 of the gear 15 and into engagement with the lugs 86 to positively drive the lower housing 72 in unison with the lower sprocket shaft 12. When, however, the collar 87 is moved to the left, the lugs 88 thereof move out of engagement with the lugs 86, and the lower clutch housing 72 is disconnected from the lower sprocket shaft 12, and the driving gear 15, the purpose of which will be later pointed out. The collar 87 thus constitutes a clutch for disengageably connecting the lower clutch housing 72 to the driving gear 15 carried by the lower sprocket shaft 12. It is apparent, however, that when the clutch housings 72 are connected, in the manner above described, they will rotate as a unit with their particular sprocket shafts and driving gears, and may therefore be broadly considered as part of the sprocket shafts.

As the lower clutch housing 72 thus rotates as a unit with the sprocket shaft 12, it is desirable to utilize this rotation of the housing to drive the sleeve 65; and, through the one-way clutch 67 and 69, to rotate the take-up spindle 57 to wind up the film being fed by the sprocket 13. Rotation of the lower housing 72 also rotates the disk 81 as a unit therewith by reason of the tongue and slot connection 82 and 83. The coil spring 80, see Fig. 2, presses on the disk 81 to urge the latter to the left and into driving engagement with an annular friction surface 92, such as cork, formed on a disk 93 splined on the sleeve 65. The left end 94 of the sleeve 65 is threaded at 95 to receive an adjusting nut 96 for positioning the disk 93 on the sleeve 65 so as to be driven by the rotating disk 81. The spring 80, acting through the disks 81 and 93 and the nut 96, tends to move the sleeve 65 axially to the left along the shaft 12, as viewed in Fig. 2, to bring an annular cork or friction ring 97 carried by the face 98 of the pawl disk 66 into frictional engagement with the bottom 73 of the casing 75.

It will now be apparent that the sleeve 65 is connected to the housing 72, and hence to the sprocket shaft 12, by means of the friction or slip clutches 92 and 97. The sleeve 65, on the other hand, is connected through the one-way clutch 67 and 69 to the sleeve 64 and hence to the lower take-up spindle 57. That latter is, therefore, connected to and driven from the sprocket shaft 12 through a combination slip and one-way clutch. As the amount of film increases on the take-up reel, the speed of the latter will gradually decrease, as is well known. To compensate for this decrease in speed, the friction or slip clutches 92 and 97 permit a slipping or relative movement between the sprocket shaft 12 and the spindle 57. Thus a constant speed sprocket shaft is utilized to drive a variable speed take-up spindle.

In view of the above description, it will be evident that when the drive shaft 25 is rotated in one direction and the member 31 of the clutch 24 is in engagement with the clutch pulley 23, the sprocket shafts 11 and 12 and the sprockets 13 will be rotated in the direction of the arrows, Fig. 1, to feed the film strip in a forward direction through the apparatus to draw the film from the upper reel 55 mounted on the upper spindle 56, which is now the supply spindle, and to wind up the film on the lower reel 55 mounted on the lower spindle 57, which is now the take-up spindle. In this forward feeding of the film strip, the one-way and slip clutches on the lower sprocket shaft 12 operatively connect the latter to the lower spindle 57 to drive the latter. During such feeding of the strip, however, the one-way clutch on the upper sprocket shaft 11 disengages, and the upper spindle is free and idles. The unwinding of the film from the upper spindle 56, however, serves to rotate the latter and, through the various drive members, rotates the upper sleeve 64 on the upper shaft 11. However, as the upper shaft 11 and the clutch housing 72 connected therewith are rotating at a higher speed than the sleeve 64, the one-way clutch is then inoperative and the upper reel mechanism idles.

When, however, rotation of the drive shaft 25 is reversed, by reversing the motor 26, the feed sprocket rotation is also reversed to feed the film strip in a reverse direction through the apparatus. During this reverse feeding, the film strip is drawn from the reel 55 mounted on the lower reel spindle 57 and is wound on a reel 55 and the upper reel spindle 56. To thus wind the reversely fed film, the one-way clutch on the upper sprocket shaft 11 becomes operative to connect the shaft 11 with the upper spindle 56 to drive the latter. The lower one-way clutch, on the other hand, becomes inoperative and the lower reel spindle 57 is disconnected from the lower sprocket shaft 12 and runs idle as a supply spindle. Thus regardless of the direction of movement of the film strip, the take-up spindle is driven to wind up the film strip, while the supply spindle is free and runs idle.

In normal operation, the film strip is fed through the machine and is withdrawn from the upper film reel and is wound up on the lower film reel. Before the strip can be again fed through the machine in proper sequence, it must be rewound, as is well known. In order to save time, such rewinding is usually done at a speed greater than the speed at which the film is normally fed by the sprockets 13. In this rewinding operation, the film is rewound on the upper film reel 55 supported on the upper film spindle 57. It is desirable, therefore, to utilize part of the drive mechanism for the upper spindle to rotate the latter during this rewinding operation.

To this end, the upper sleeve 64 has secured thereto a ring gear 101 so that the latter will rotate as a unit with the upper sleeve 64 and its gear 63. A shaft 102 has secured to one end thereof a pinion gear 103 which meshes with and drives the gear 101. Now if the shaft 102 is rotated in the direction of the dotted arrow, Fig. 1, gear 101 will be rotated in a direction to drive the spindle 56, as indicated by the dotted arrow, to rewind the film strip on the film reel 55 carried thereby. It will be noticed that this is the same direction in which the spindle 56 is rotated when the film strip is fed in a reverse direction through the apparatus by the sprockets 13. However, due to the size of the gears 101 and 103, the spindle 56 is driven at a higher rate of speed during the rewinding operation. The shaft 102 may, therefore, be designated as "rewind shaft" to distinguish it from the "film feeding shaft 20," previously described. This rewinding shaft 102 is also preferably connectable to and driven by the main drive shaft 25. To secure this result, the opposite end of the shaft 102 has secured thereto a pulley 104 which is connected by a belt 105 to the other loose pulley 30 on the drive shaft 25. Now when the slidable member 31 is moved to the left, as viewed in Fig. 6, it will engage the pulley 30 to operatively connect the latter, and hence the rewind shaft 102, to the drive shaft 25 so the latter may become effective to drive the spindle 56 to rewind the film strip thereon. However, in such rewinding, the shaft 25 must be run in a reverse direction, or in the same direction as when the film strip is being fed in a reverse direction by the sprocket 13, as shown by the dotted arrow.

When the slidable member 31 is moved into engagement with the loose pulley 30, it obviously is disconnected from the other pulley 23 so that the film feeding mechanism now becomes inoperative and remains stationary during the film rewinding operation. During such operation, however, the film strip is being withdrawn from the reel 55 on the lower spindle 57. Such withdrawal tends to rotate the latter in the same direction as during the reverse feeding of the film strip, as above described. This turning of the spindle 57 will also drive the lower sleeve 64 in the direction opposite to that shown by the arrow in Fig. 1. However, as the shaft 12 and the lower clutch housing 72 are now stationary, by reason of the disengagement of the clutch pulley 23, such rotation of the sleeve 64 may tend to engage the lower one-way clutch 67 and 69 to actually drive the lower clutch housing 72. It is apparent, however, that if this lower housing 72 were driven, the film feeding mechanism would also be driven due to the interconnection of the housing 72 with the lower sprocket shaft 12. In order to prevent this, the lower clutch housing 72 is positively disconnected from the lower sprocket shaft 12 during the rewind operation. To secure this result, the slidable collar 87 may be slid to the left to disengage the lugs 88 thereof from the lugs 86 on the lower clutch housing 72 to free the latter. Now even if the lower one-way clutch should become engaged when the sleeve 64 is rotated during rewinding operation, and thus cause rotation of the lower housing 72, the film feeding mechanism, being disconnected therefrom, will remain stationary.

The collar 87 may be moved into and out of engagement with the lower clutch housing 72 by means of a lever 110 which is pivoted at 111 on the projector frame or housing. The upper end 112 of this sleeve is forked to engage a slot 113 formed in the collar 87, see Figs. 1 and 2. The lower end 114 of the lever engages a rotary cam 115 carried by a shaft 116. When the latter is rotated or rocked in a counter-clockwise direction or in the direction of the arrows, Fig. 1, the cam 115 engages the lower end 114 of the lever 110 to tilt or rock the latter in a clockwise direction, see Fig. 1, to shift the collar 87 to the right and into engagement with the lower clutch housing 72. The shaft 116 also carries a cam 117 which is positioned between a pair of spaced or forked portions 118 and 119 on the shifting lever 43. Now when the shaft 117 is rotated, as above described, the cam 117 engages the arm 118 of the shifting lever to move the latter to the right, see Fig. 1, about its pivot 44 to shift the member 31 into engagement with the pulley 23 to operatively connect the film feeding mechanism to the drive shaft, as above described.

The shaft 116 is operated by a handle 120 secured to the end opposite the cam 115, see Fig. 1. A light switch 121, connected into the circuit of the projection lamp, not shown, is positioned below the shaft 116 so that the operating plunger 122 thereof is in alignment with a radial arm 123 carried by the shaft 116 so that the counter-clockwise movement of the shaft 116 serves also to move the arm 123 into engagement with the plunger 122 to close the light switch 121 to energize the projection lamp. Thus, counter-clockwise movement of the shaft 116 simultaneously closes the lamp switch 121, connects the film feeding shaft 20 to the drive shaft 25, and shifts the collar 87 into engagement with the lower clutch housing 72 to connect the clutches therein to the lower sprocket shaft 12. When these members are thus connected, the handle is in the position shown in Fig. 1. Now if the handle is moved to a horizontal position, the shaft 116 is given a partial rotation in a clockwise direction to cause the cam 117 to engage the arm 119 to shift the lever 43 to pivot the latter and slide the member 31 out of engagement with the pulley 23 and into the intermediate or neutral position in which it is disconnected from both from the pulleys 23 and 30 so as to stop the film feeding mechanism to permit the projection of stills. However, a further or final upward movement of the handle 20 will move the arm 123 out of engagement with the plunger 122 of the light switch to open the latter to thus extinguish the projection lamp. This final movement of the handle 120 also serves to cause the cam 117 to further pivot the lever 43 to shift the slidable clutch member 31 into engagement with the other pulley 30 to operatively connect the drive shaft 25 to the rewind shaft 102. In addition, the cam 115 moves out of engagement with the lower end 114 of the lever 110, and a spring 124 now becomes operative to rock the lever 110 in a counter-clockwise direction, see Fig. 1, to shift the collar 87 out of engaging relation with the lower clutch housing 72 to positively disconnect the latter from the lower sprocket shaft 12, for the reasons pointed out above. Thus by suitably positioning the handle 120 or rocking the shaft 116, the film feeding or the film winding mechanism may be selectively and separately connected to the drive shaft, or both of these mechanisms may be disconnected from the drive shaft to permit the projection of stills.

It is apparent from the above description that the present invention thus provides projection controls by which a film strip may be fed through the projector either in a forward or a reverse direction, or may be stopped to project stills, or may be rewound at a high rate of speed. Furthermore, the movement of the controls to connect one of these mechanisms to the drive shaft automatically and completely disconnects the other mechanism therefrom. In addition, the connection of the film feeding mechanism to the drive shaft simultaneously and automatically closes the lamp switch and connects the lower one-way and slip clutch to the lower sprocket shaft.

While one embodiment of the invention has been disclosed, it is to be understood that the inventive idea may be carried out in a number of ways. This application is therefore not to be limited to the precise details described but is intended to cover all variations and modifications thereof falling within the scope of the appended claims.

We claim:

1. In a projecting apparatus, the combination with a film feeding mechanism and a film rewinding mechanism, of a drive shaft, a pair of members loosely mounted on said shaft, means for operatively connecting one of said members to said feeding mechanism, means for operatively connecting the other of said members to said rewinding mechanism, a drive member splined to said shaft and positioned between said loosely mounted members, means for moving said drive member in one direction along said shaft to engage said one member to operatively connect said drive shaft to said feeding means, said moving means being also movable along said shaft in the opposite direction to disconnect said feeding means from said drive shaft, said moving means being also movable further in said opposite direction to engage said drive member with said other loose member to operatively connect said rewinding mechanism to said drive shaft, said shaft being formed with spaced peripheral grooves, and a spring pressed ball carried by said drive member and adapted to be positioned in one of said grooves to connect said drive member with one or to disconnect it from both of said loosely mounted members.

2. In a projecting apparatus, the combination with a sprocket adapted to feed a film strip through said apparatus, a supporting shaft to which said sprocket is secured, means for rotating said shaft in opposite directions so that said sprocket may feed said film strip in either a forward or reverse direction through said apparatus, of a take-up spindle adapted to support a film reel on which said film is wound, a combination slip and one-way clutch mounted on said shaft, means for operatively connecting said clutches to said spindle, a clutch housing loosely mounted on said shaft, means for operatively connecting said housing to said clutches, and means for disengageably connecting said housing with said shaft so as to rotate as a unit therewith, said slip clutch permitting slippage between said spindle and shaft as the amount of film on said reel increases, said one-way clutch serving to operatively connect said spindle in driving relation with said shaft to be driven thereby when said strip is fed in said forward direction but automatically disconnecting said spindle to free the latter when said strip is fed in said reverse direction.

3. In a projecting apparatus, the combination with a film feeding mechanism comprising a sprocket shaft, a sprocket carried by said shaft and adapted to engage a film strip to feed the latter through said apparatus, a take-up spindle, a drive shaft, of a gear rigidly connected to said sprocket shaft to positively drive the latter, a clutch comprising a pair of members loosely mounted on said sprocket shaft and connectable to said spindle, and means for simultaneously connecting said gear to said drive shaft to drive said sprocket and for connecting both of said clutch members to said gear so that said spindle will be driven from said sprocket shaft.

4. In a projecting apparatus, the combination with a film feeding mechanism comprising a sprocket shaft, a sprocket carried by said shaft and adapted to engage a film strip to feed the latter through said apparatus, a take-up spindle, a drive shaft, of a gear connected to said sprocket shaft to drive the latter and said sprocket, a one-way clutch loosely mounted on said sprocket shaft and connectable to said spindle to drive the latter when said sprocket shaft is driven in a forward film feeding direction but disconnectable from said spindle to free the latter when said sprocket shaft is driven in a reverse direction, a slip clutch loosely mounted on said sprocket shaft and operatively connected to said one-way clutch, a clutch slidably mounted on said sprocket shaft and adapted to connect said slip and one-way clutch to said gear so as to be driven thereby, and means for connecting said drive shaft to said gear and for simultaneously connecting said clutches thereto to drive said spindle. said slip clutch permitting slippage of said spindle relative to said sprocket shaft to compensate for the increasing amount of film wound up on said spindle.

5. In a projecting apparatus, the combination with a film feeding mechanism comprising a sprocket shaft, a sprocket carried by said shaft and adapted to engage a film strip to feed the latter through said apparatus, a take-up spindle, a drive shaft, of a gear connected to said sprocket shaft to drive the latter and said sprocket, a one-way clutch loosely mounted on said sprocket shaft and connectable to said spindle to drive the latter when said sprocket shaft is driven in a forward film feeding direction but disconnectable from said spindle to free the latter when said sprocket shaft is driven in a reverse direction, a slip clutch loosely mounted on said sprocket shaft and operatively connected to said one-way clutch, a clutch slidably mounted on said sprocket shaft and adapted to connect said slip and one-way clutch to said gear so as to be driven thereby, a clutch on said drive shaft, and means for operatively connecting said clutches so that said drive shaft may drive said sprocket shaft and the latter may be connected to and drive said spindle.

6. In a projecting apparatus, the combination with a pair of sprocket shafts and a film feeding sprocket carried by each of said shafts for feeding a film strip through said apparatus, a drive shaft, of a film feeding shaft, means for connecting said film feeding shaft to both of said sprocket shafts to drive the latter to feed said strip, means for releasably connecting said feeding shaft to said drive shaft, a film take-up spindle, drive means for said spindle comprising a member loosely mounted on one of said sprocket shafts, means for releasably connecting said member to said one sprocket shaft, a film rewinding shaft, a film supply spindle, drive means for said supply spindle comprising a portion loosely mounted on said other sprocket shaft, means for connecting said rewind shaft to said portion so that rotation of said rewind shaft will drive said supply spindle to rewind the film strip thereon, means for detachably connecting said rewind shaft to said drive shaft, and means for selectively connecting said film feeding or rewinding shafts to said drive shaft.

7. In a projecting apparatus, the combination with a pair of sprocket shafts and a film feeding sprocket carried by each of said shafts for feeding a film strip through said apparatus, a reversible drive shaft, of a film feeding shaft, means for connecting said feeding shaft to both of said sprocket shafts to drive the latter to feed said strip, means for operatively connecting said feeding shaft to said reversible drive shaft, a pair of film spindles adapted to receive film reels, means for releasably connecting said spindles to said sprocket shafts so that when the latter are driven by said drive shaft to move the film in a forward direction through the apparatus one of the spindles will be operatively connected to one of the sprocket shafts to be driven thereby to wind up the forwardly fed film strip while the other spindle will be disconnected from the other sprocket shaft so as to run idle, but when the sprocket shafts are rotated to move the strip in a reverse direction through said apparatus said one spindle will be automatically disconnected from said one sprocket shaft so as to run idle while said other spindle will then be automatically operatively connected to said other sprocket shaft to be driven thereby to wind up the reversely driven strip, a film rewind shaft, means for connecting said rewind shaft to one of said spindles so that upon operation of said rewind shaft said last mentioned one spindle will be operated to rewind said film strip, means for detachably connecting said rewind shaft to said drive shaft, and means for selectively connecting the drive shaft in driving relation with either the film feeding shaft or the film rewind shaft.

8. In a projecting apparatus, the combination with a pair of sprocket shafts and a film feeding sprocket carried by each of said shafts for feeding a film strip through said apparatus, a drive shaft adapted to be rotated in opposite directions, of a film feeding shaft, means for positively connecting said feeding shaft in driving relation with said sprocket shafts, a clutch member carried by said drive shaft, means for operatively connecting said feeding shaft to said clutch member, a pair of film spindles, clutches carried by said sprocket shafts for disengageably connecting one of said sprocket shafts to one of said spindles, means for connecting said clutches to said sprocket shafts, the rotation of said sprocket shafts in one direction by said drive shaft serving to engage one of said clutches to connect one spindle to one of said sprocket shafts to be driven thereby and disconnecting another of said clutches to free the other spindle, and the rotation of the sprocket shafts in the opposite direction serving to disconnect the previously connected spindle from its sprocket shaft and simultaneously connecting the previously disconnected spindle to its sprocket shaft, a film rewinding shaft, a second clutch member on said drive shaft, means for connecting said second clutch member to said rewind shaft, and a slidable connecting member splined on said drive shaft and movable into engagement with the clutch members on the drive shaft connected to the film feeding or rewinding shafts to selectively connect one of these shafts to the drive shaft so as to be driven thereby.

9. In a projecting apparatus, the combination with a pair of sprocket shafts and a film feeding sprocket carried by each of said shafts for feeding a film strip through said apparatus, a drive shaft adapted to be rotated in opposite directions, of a film feeding shaft, means for connecting said feeding shaft to said sprocket shafts to drive the latter, a pair of clutch members loosely mounted on said drive shaft, means for operatively connecting said feeding shaft to one of said loose clutch members, a pair of film spindles, a combination one-way and slip clutch carried by each of said sprocket shafts and adapted to be operatively connected to one of said spindles, means for permanently connecting one of said one-way and slip clutches to one of said sprocket shafts, a slidable collar mounted on said other sprocket shaft and adapted to be moved into position to connect the second one-way and slip clutch to said other sprocket shaft, a pivoted lever connected to said slidable collar for moving the latter into and out of clutch connecting position, the rotation of said sprocket shafts in one direction to feed the film in a forward direction through said apparatus serving to connect one of said sprocket shafts through its one-way and slip clutch to one of said spindles to drive the latter to wind up the film, the other one-way and slip clutch being arranged to disconnect the other spindle from the other sprocket shaft, rotation of the sprocket shafts in the opposite direction to feed the film strip in a reverse direction through said apparatus serving to disengage the previously connected one-way and slip clutch to free the spindle associated therewith and the other one-way and slip clutch then operatively connecting the previously free spindle to the other sprocket shaft so as to be driven thereby, said slip clutches permitting slippage between the spindle being driven and its driving sprocket shaft to compensate for the increasing amount of the film strip being wound up, a member operatively connected to said last mentioned connected spindle, a film rewind shaft connected to said member, means for connecting said rewind shaft to the other loose clutch member on said drive shaft, a member splined on said drive shaft and movable axially therealong and into engagement with one of the loose clutch members thereon to selectively connect either the feeding or the rewinding shaft to said drive shaft, a pivoted member connected to said splined member for moving the latter along said drive shaft, and means movable to one position for simultaneously actuating said pivoted member to move the splined member into engagement with the loose clutch member on the drive shaft connected to said feeding shaft, and for moving the pivoted lever to slide said collar into clutch connecting position to connect said other sprocket shaft to said drive shaft, said last mentioned means being also movable to an intermediate position to move said pivoted member to shift said splined member out of engagement with either of said loose clutch members on the drive shaft to disconnect the latter from both the feeding and rewind shaft and for shifting the collar out of clutch connecting position to disconnect the sprocket shafts from the drive shaft, said last means being also movable to a third position to actuate said pivoted member to move said splined clutch member to engage the latter with the loose clutch member on the drive shaft connected to the rewind shaft so that the latter may be operatively connected to and driven by the drive shaft.

HENRY N. FAIRBANKS.
ROGER W. WALLACE.